(12) United States Patent
Han et al.

(10) Patent No.: US 11,171,893 B2
(45) Date of Patent: *Nov. 9, 2021

(54) METHODS AND SYSTEMS FOR PROVIDING VIRTUAL COLLABORATION VIA NETWORK

(71) Applicant: Zhou Lu, Los Altos, CA (US)

(72) Inventors: Gang Han, San Jose, CA (US); Zhou Lu, Los Altos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/593,959

(22) Filed: Oct. 4, 2019

(65) Prior Publication Data
US 2020/0076748 A1 Mar. 5, 2020

Related U.S. Application Data

(63) Continuation of application No. 14/846,793, filed on Sep. 6, 2015, now Pat. No. 10,511,551.

(60) Provisional application No. 62/046,952, filed on Sep. 6, 2014.

(51) Int. Cl.
*H04L 12/58* (2006.01)

(52) U.S. Cl.
CPC .............. *H04L 51/04* (2013.01); *H04L 51/10* (2013.01)

(58) Field of Classification Search
CPC .................................. H04L 51/04; H04L 51/10
See application file for complete search history.

(56) References Cited

U.S. PATENT DOCUMENTS

| 5,717,869 A | * | 2/1998 | Moran | ................... | G11B 27/34 |
| | | | | | 715/716 |
| 2013/0254681 A1 | * | 9/2013 | DeLuca | .............. | G06F 16/9558 |
| | | | | | 715/753 |

* cited by examiner

*Primary Examiner* — Viet D Vu

(57) ABSTRACT

Various embodiments of the present technology provide an online and/or offline meeting system that utilizes a "scene" as a collaboration context and/or for collecting and grouping related multimedia based messages exchanged in discussions, and causes the related messages to be presented to participants of an online and/or offline meeting in a cinematic way. When an online meeting is over and the meeting session is ended, participants can still make offline communications using the scene as the collaboration context. Further, the present technology improves user experience in viewing or annotating non-text based content in a chat session.

18 Claims, 20 Drawing Sheets

This example shows 2 type of tag. "A" is a standard tag with a system assigned index and user added text/voice as showed in Fig. 4.

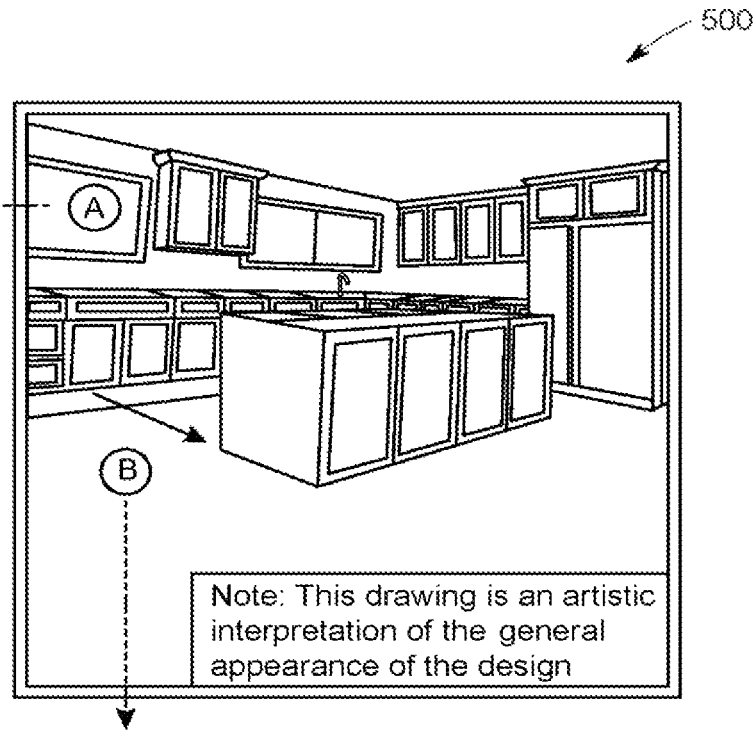

"B" is a drawing tag:
The drawing tag is created when a user choose "Draw" from the context menu which is described in Fig. 3:

1. The app tracks the user's finger touch (or cursor trail on PC) and convert the traces into a geometric object such as a line, a circle, or a rectangle.
2. After the geometric object is built, the system will assign an index to this tag which is showed as "B" in the this example
3. The "erase" button from the context menu (Fig. 3) can be used to revise or remove a geometric object on a context window.
4. The user can add and/or voice messages associated with a tag or scene on a context.

FIG. 5

METHODS AND SYSTEMS FOR PROVIDING VIRTUAL COLLABORATION VIA NETWORK

CROSS-REFERENCE TO RELATED APPLICATION

This application claims priority to U.S. Non-Provisional application Ser. No. 14/846,793, filed Sep. 6, 2015, now issued as U.S. Pat. No. 10,511,551, and U.S. Provisional Application No. 62/046,952, filed Sep. 6, 2014, the disclosure of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Email and chat are good to pass around text and multimedia based contents with a group of people. However, email and chat do not bring a whiteboard based face-to-face experience for discussions with multiple participants. On the other hand, some online meeting applications offer a shared whiteboard with multiple supported document formats but require participants to join in the meeting online at a scheduled time.

Further, users desire for better experiences in sharing non-text based content on a text-based chat platforms.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates two example tags in accordance with various embodiments;

DETAILED DESCRIPTION

Systems and methods in accordance with various embodiments of the present disclosure overcome deficiencies in conventional approaches in rendering emails and chats on a computing device. Some embodiments provide an online and/or offline meeting system that utilizes a "scene" as a collaboration context and/or for collecting and grouping related texts and multimedia based messages exchanged in discussions (e.g., extended resources like the scene and audio/video contents can be organized with session IDs, scene ID and timestamp, which can be used for database query), and causes the related texts and/or messages to be presented to participants of an online and/or offline meeting in a cinematic way. When an online meeting is over and the meeting session is ended, participants can still make offline communications using the scene as the collaboration context. For example, a chat base collaboration may be used to build up a collaboration between an instructor and multiple students, or a celebrity and millions followers.

Further, the present technology solves problems in adding non-text based content (e.g., image and video) into a text-based chat platform. On a traditional chat platform, newly arrived messages keep pushing old messages off a display screen of the chat platform, which makes it difficult to implement a collaboration whiteboard on the chat platform. Some embodiments of the present technology solve the problems by using a chat compositor to bring non-text based content naturally into a chat session.

FIG. 1 illustrates an example of a scene-based collaboration 110 in accordance with various embodiments. The scene-based collaboration can be provided either online or offline, in this example, a scene-based collaboration includes a scene window for collaboration context (e.g., scenes, texts, images, videos, and/or animations), a chat window, an input bar, a timeline slider, and a participant row (e.g., for a participant to send private messages to other participants).

Tags in the scene based collaboration include a standard tag and a drawing tag. Each session of the scene based collaboration may have one or more scenes that can serve as a starter of a chat-like collaboration. In some embodiments, a scene in a scene-based-collaboration can serve as a container of related chat messages.

Figure 1A:
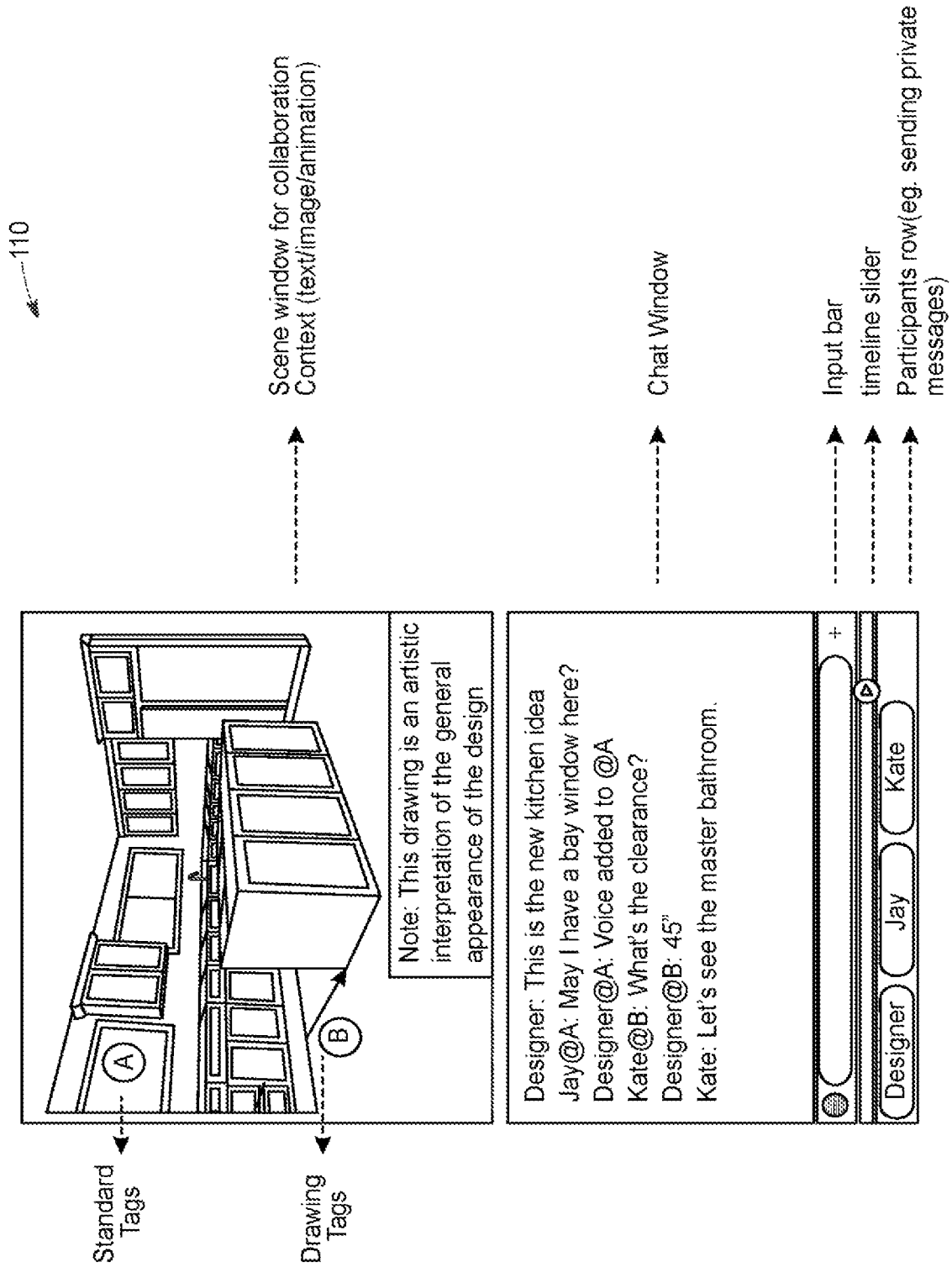
FIGS. 1A-1E illustrates examples of scene based collaboration in accordance with various embodiments.
Figure 1B:
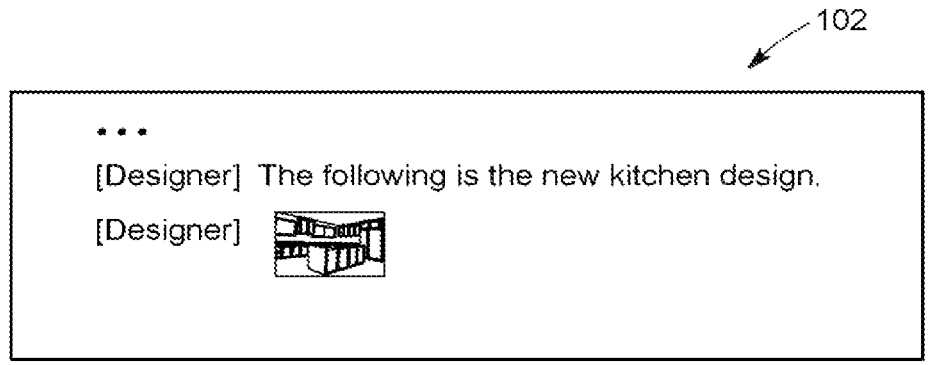
Figure 1C:
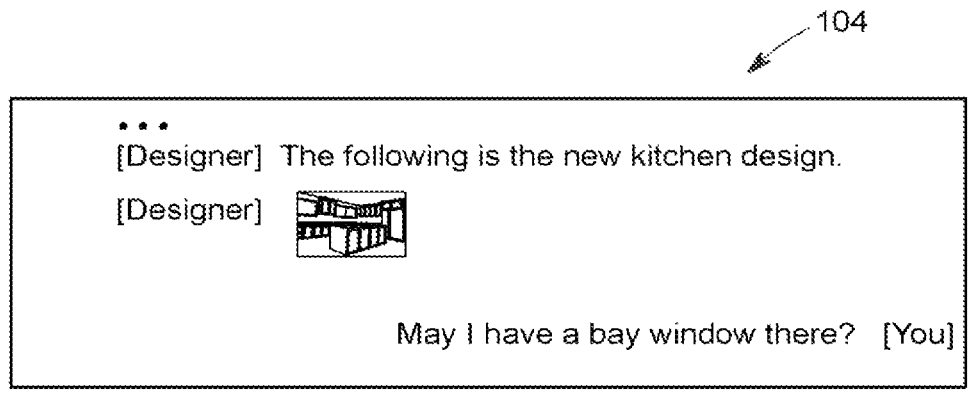

In a traditional text-based chat platform, as illustrated in FIGS. 1B and 1C, participants of a chat session may exchange non-text content, such as a drawing. However, after a participant shares the non-text based content (e.g., an image), other participant(s) have to tap on the content to open and then review it.

Figure 1D:
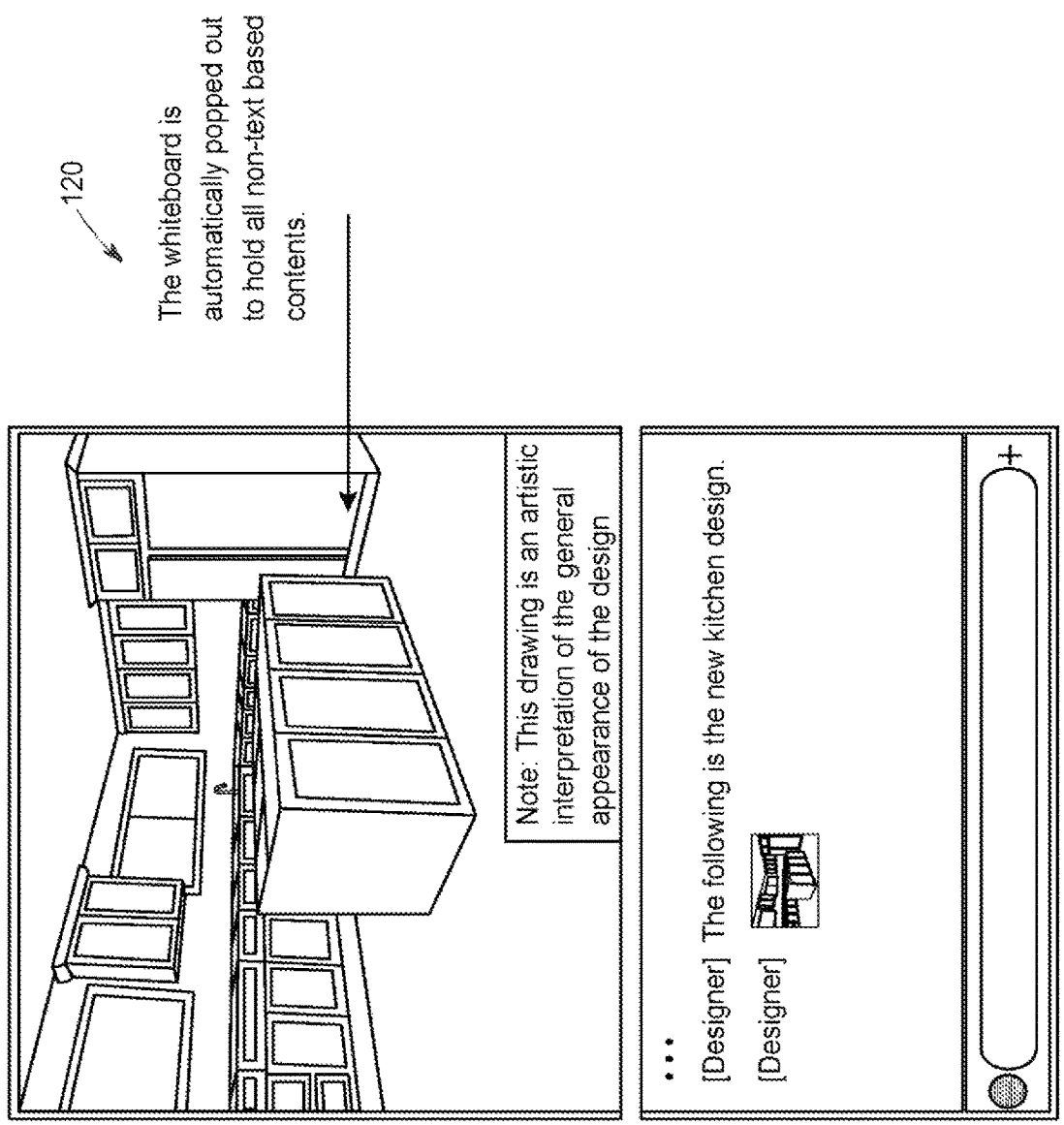
Figure 1E:
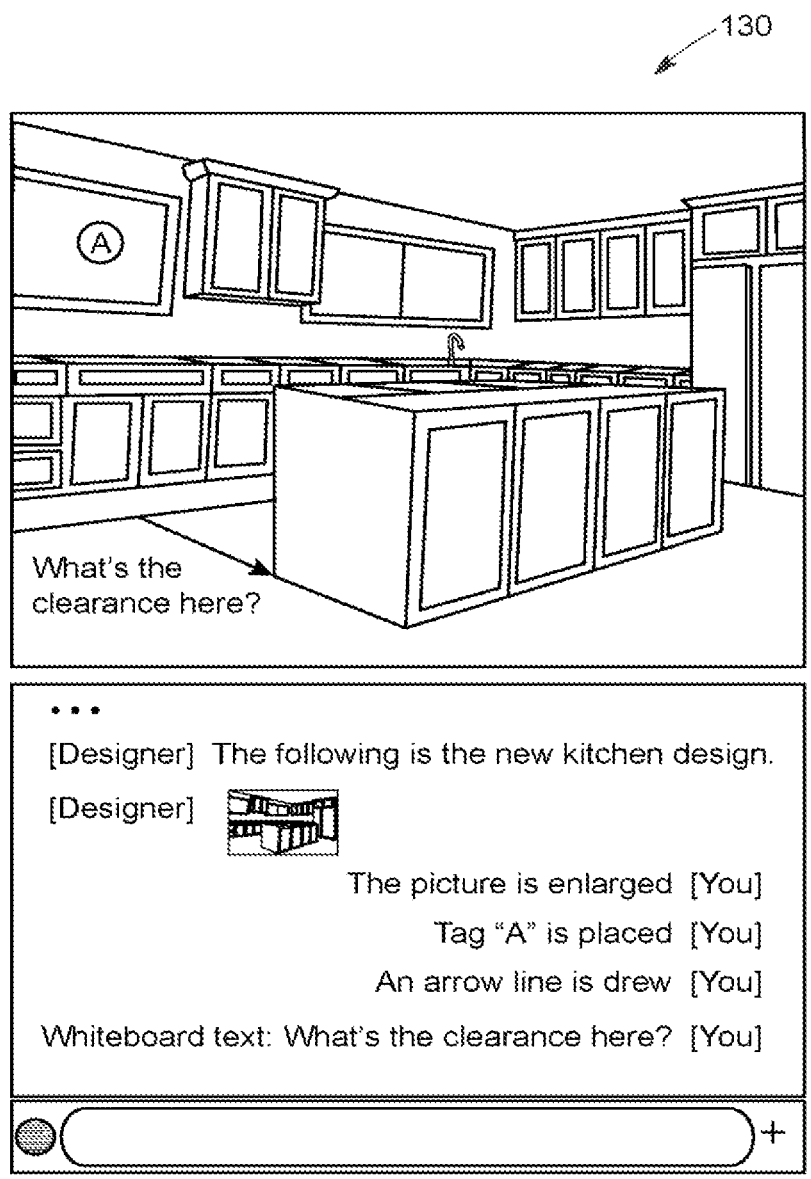

Some implementations of the present technology can automatically provide a whiteboard using a chat compositor when one participant of a chat session shares non-text based content, as illustrated in FIGS. 1D and 1E. In some instances, options can be provided to participants of the chat session to enable or disable the chat compositor such that a participant may engage or disengage discussions associated with the whiteboard. In some embodiments, the chat compositor can run locally on user devices of participants of the chat session. The whiteboard (e.g., 120 and 130) can be a container of non-text based chats or user interactions. Each participant can manage the whiteboard and chat session on his/her user device. For example, a participant may resize a whiteboard or a shared image (pan-and-scan), or add tags, lines, or text messages. Participants' actions associated with the whiteboard or chat session can be rendered together with corresponding timestamps via chat messages using the chat compositor, as illustrated in FIG. 1E.

Figure 2:
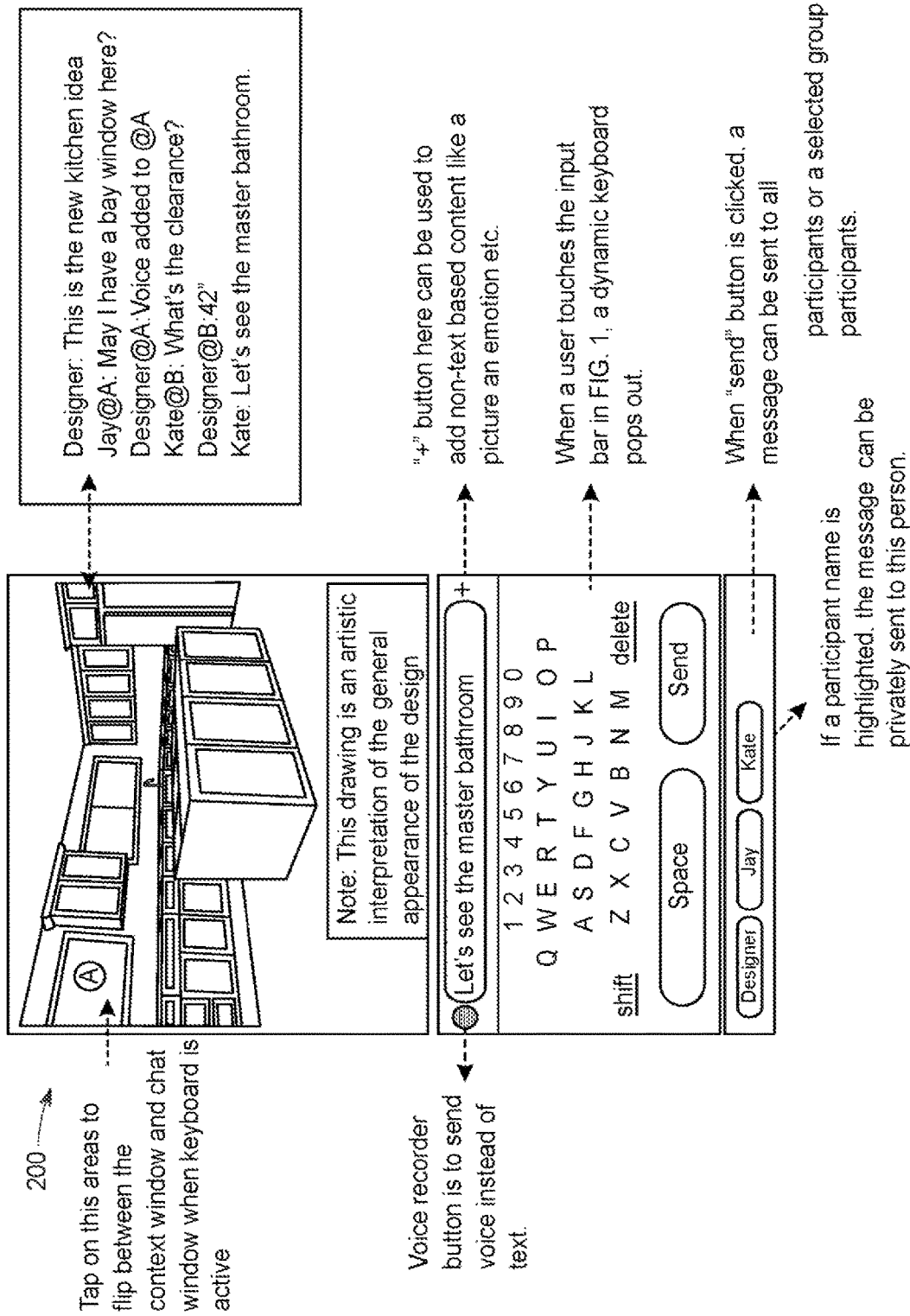
FIG. 2 illustrates an example of inputting chat message in accordance with various embodiments.

In FIG. 2 illustrates an example of inputting a chat message into a scene-based collaboration 200 in accordance with various embodiments. In this example, a user can touch a certain area to flip between a context window and a chat window when a keyboard is active. A user may touch a voice recorder button to send a voice message instead of text, or touch a "+" button to add non-text based content such as, but not limited to, a picture, an emotion, a video, a symbol etc. In some embodiments, a dynamic keyboard may be provided in response to a user touching an input bar.

In some embodiments, a user may send a message to all participants by clicking a "send" button or a select group of participants of a collaboration session. For example, a user may highlight names of intended participants. Once the intended participants are highlighted, a message may be only sent to highlighted participants.

Figure 3:
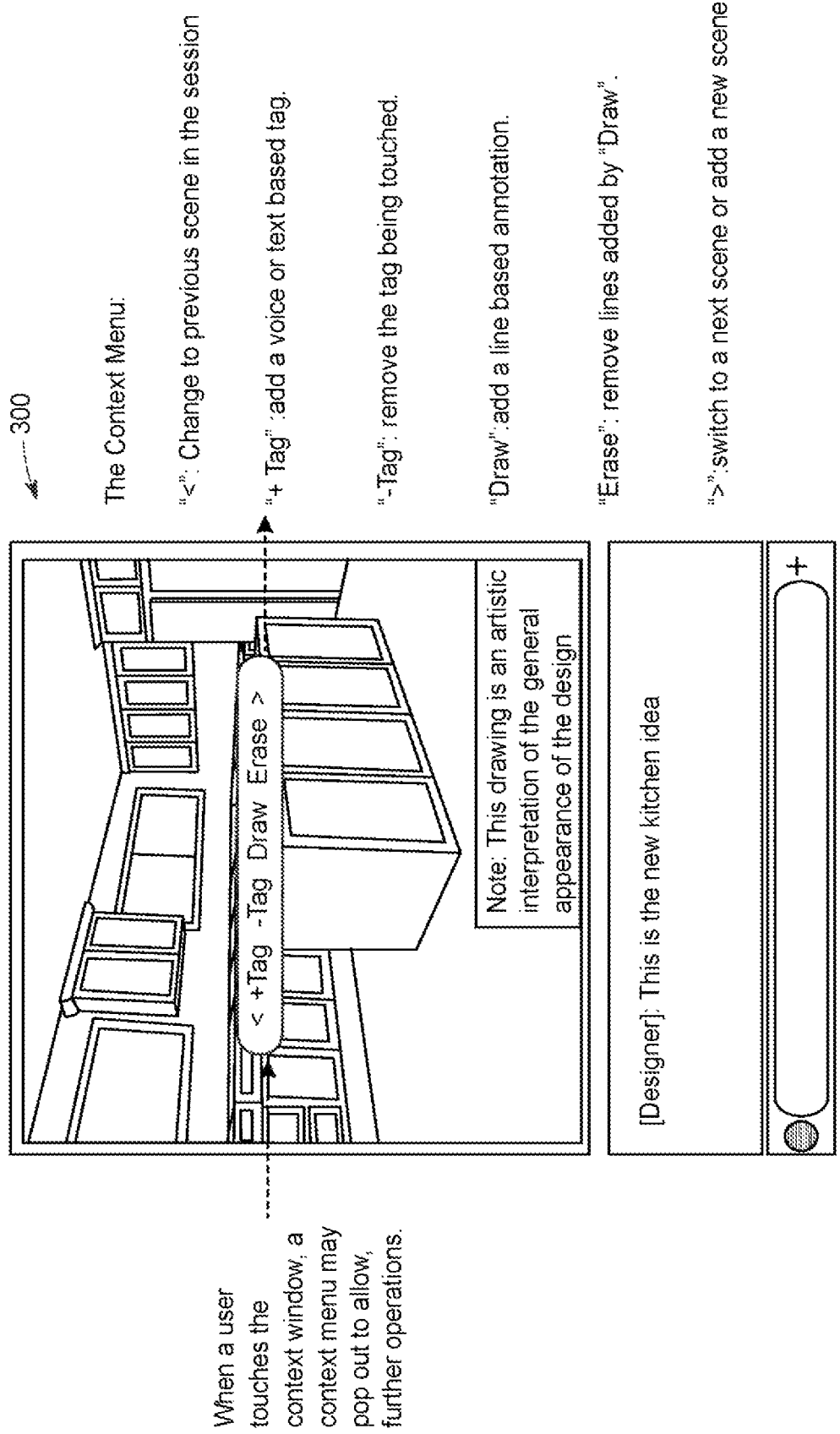
FIG. 3 illustrates an example of context menu when a context window is touched by a user in accordance with various embodiments.

FIG. 3 illustrates an example of context menu when a context window of a scene-based collaboration 300 is touched by a user in accordance with various embodiments. In this example, when a participant of a chat session touches the context window, a context menu may be pop out to provide options for the participant to select. For example, the participant may select "<" to go back to a previous scene in the session or select "+Tag" to add a voice or text based tag. Other options may include, but are not limited to, "−Tag" for removing a tag being touched, "Draw" for adding a line-based annotation, "Erase" for removing a line, or ">" for switching to a next scene or adding a new scene.

Figure 4:
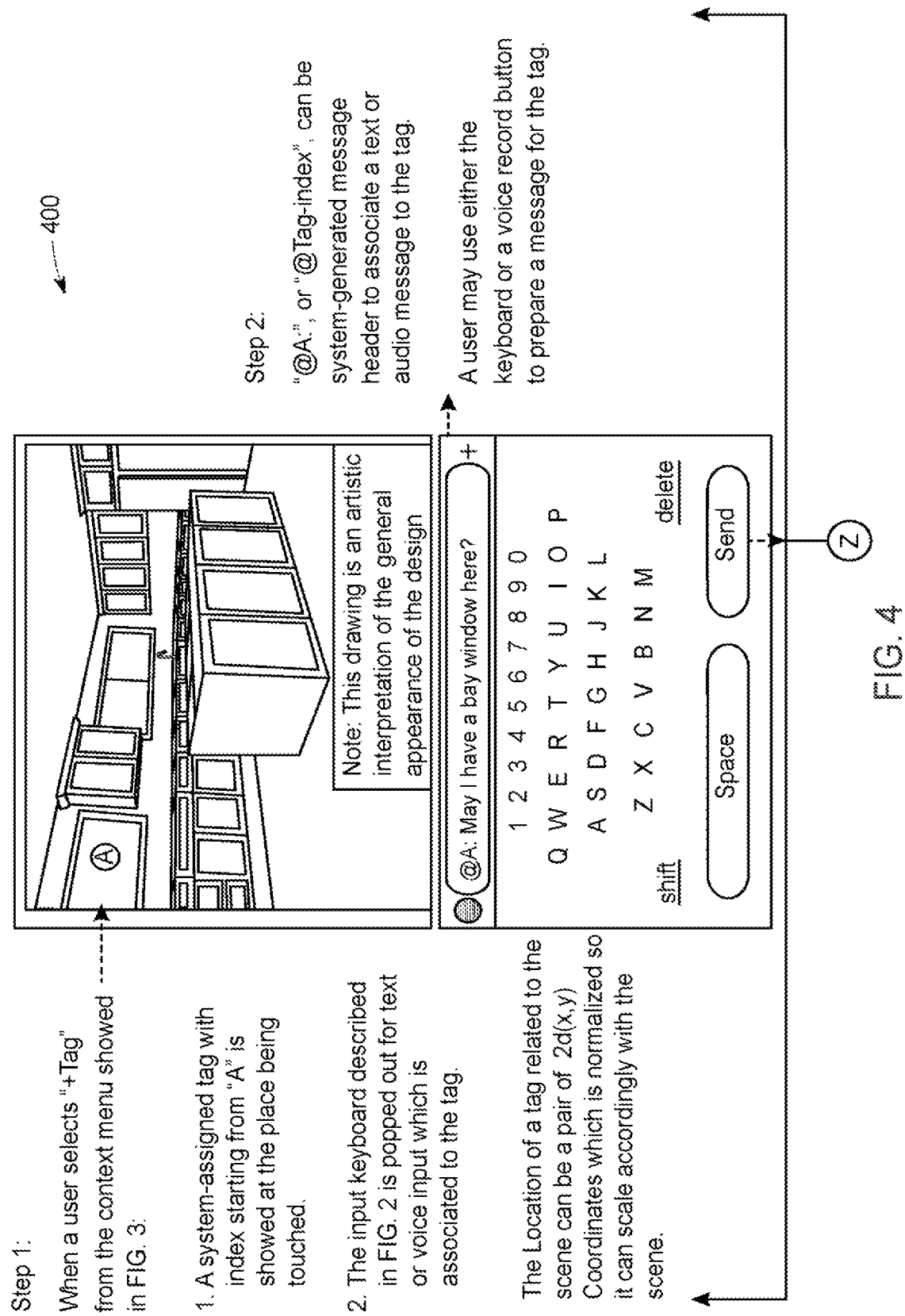
FIG. 4 illustrates an example of adding a tag on a virtual whiteboard in accordance with various embodiments.
Figure 4:
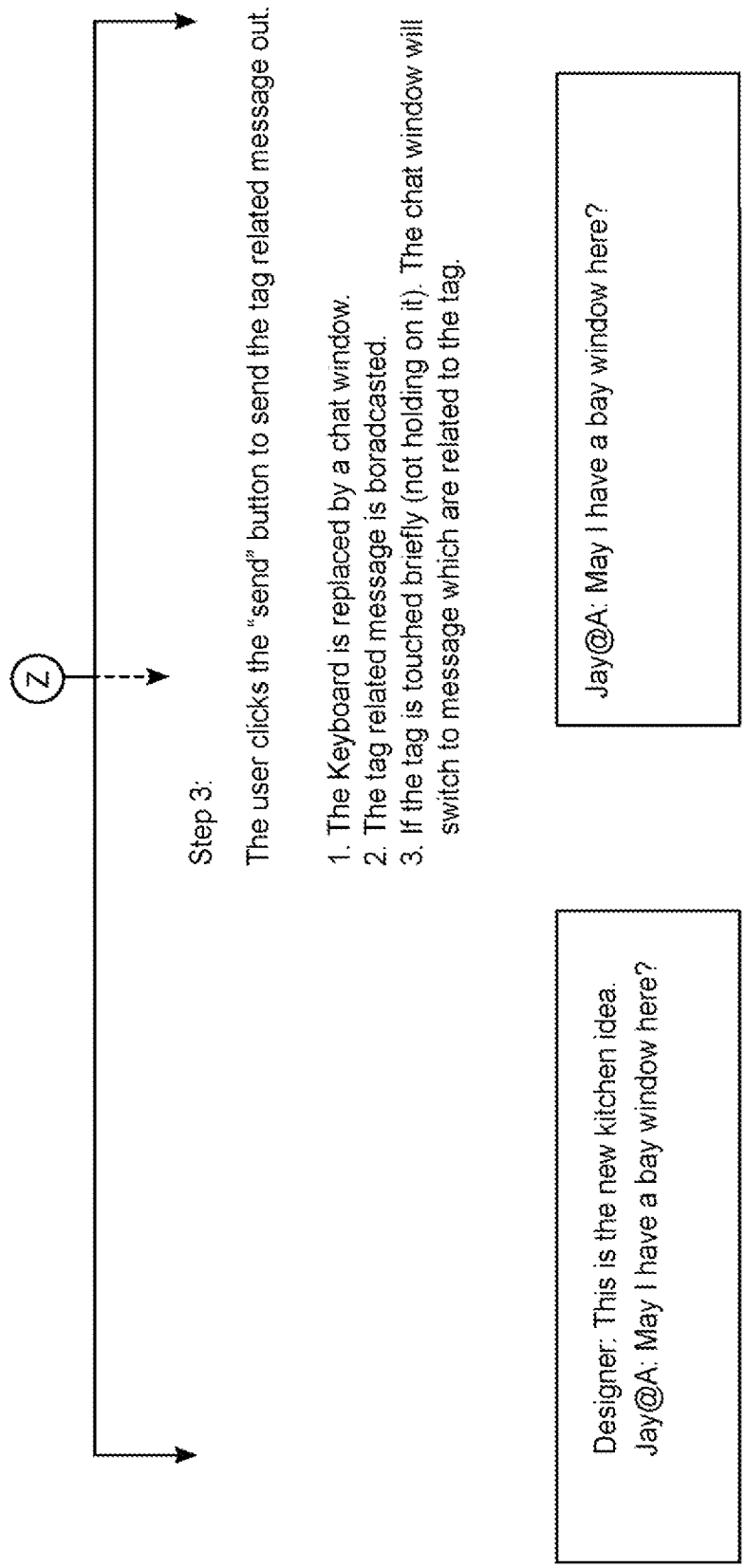

FIG. 4 illustrates an example of adding a tag on a virtual whiteboard 400 in accordance with various embodiments. In this example, in response to a "+Tag" being selected by a user from a context menu, a system-assigned tag with an index (e.g., alphabetically) can be showed at the place being touched. An input keyboard (e.g., as illustrated in FIG. 2) may be popped up for text or voice inputs that are associated with the tag. In some embodiments, a location of a tag related to a scene can be a two-dimensional coordinate that is normalized to the scale of the corresponding scene.

In some embodiments, a system-generated message header (e.g., @A or @Tag-Index) can be provided in an input bar. A user can type in text messages via a dynamic keyboard or by recording an audio for a corresponding tag (e.g., record audio by pressing a record button).

In response to a user sending a tag-related message, the dynamic keyboard can be replaced with a chat window. The tag-related message may be broadcasted to all participants of the virtual whiteboard or a sub-group designated by the user. In some embodiments, if a tag is touch briefly (e.g., not holding over a predetermined period of time), a chat window can be switched to messages that are all related to the tag.

FIG. 5 illustrates two example tags on a virtual whiteboard 500 in accordance with various embodiments. One type of tag is a standard tag with a system-assigned index and/or user-added text and voice. Another type of tag is a drawing tag, which may be created from a context menu illustrated in FIG. 3. In some embodiments, a computing device may be configured to track a user's finger touches on a display and trace out the touches to convert into a two-dimension geometric object (e.g., a square, rectangle, or circle) or a one-dimension line or dot. In response to a geometric object being built, an index to the tag can be assigned, which is a "B" in this example. In some embodiments, an "erase" button can be provided for a user to revise or remove a geometric object on a context window. In some embodiments, a user can add text and/or voice messages associated with a tag or scene on a context window.

Figure 6:
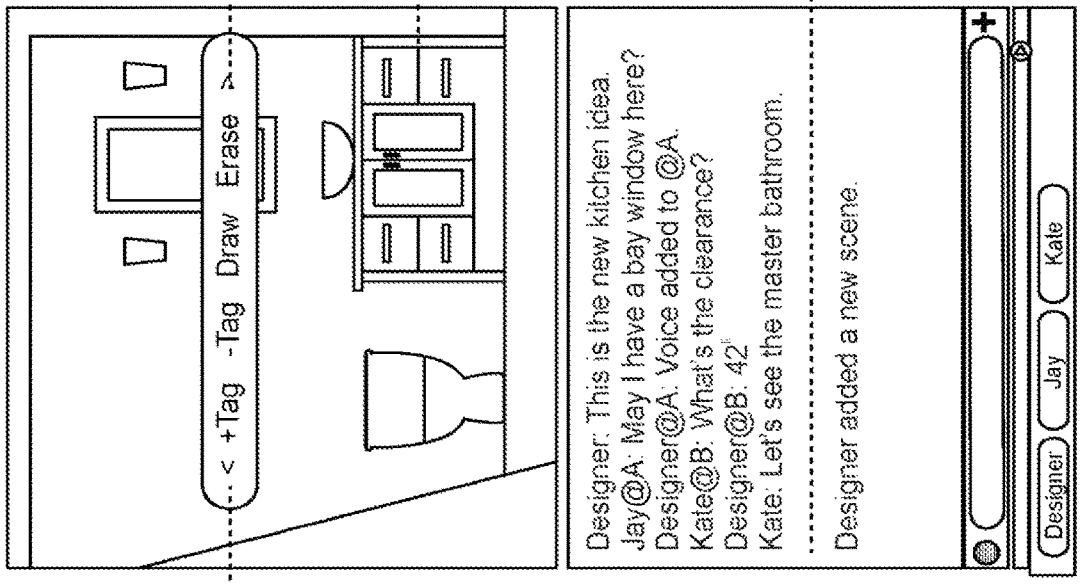
FIG. 6 illustrates an example process of managing scenes in a session in accordance with various embodiments.

FIG. 6 illustrates an example process of managing scenes in a collaboration session 600 in accordance with various embodiments. In this example, a participant of the collaboration session may use a "<" button to go back to a prior scene in the collaboration session or use a ">" button to maneuver to a new scene in the collaboration session or add a new scene to the collaboration session. In response to a prior scene being brought back on a user screen, participants' discussions, annotations, and other activities associated with the prior scene can be restored on the user screen.

In some embodiments, a collaboration session may include one or more scenes, with each of them has more than one pictures, texts, videos, and/or rendering-based animations. In some embodiments, all participants or a designated group of participants of a collaboration session may be notified when a new scene is added to the session.

Figure 7:
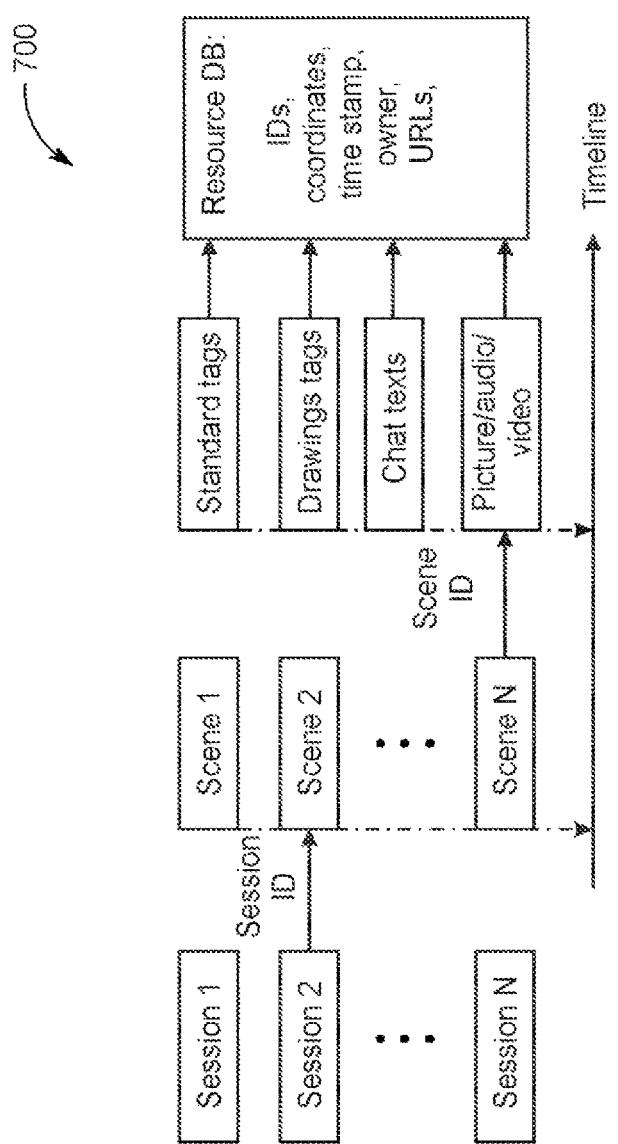
FIG. 7 illustrates an example process of managing resources within a session in accordance with various embodiments.

FIG. 7 illustrates an example process 700 of managing resources within a session in accordance with various embodiments. In some embodiments, a collaboration session has a unique identification (ID). In some implementations, each scene, each annotation tag or drawing in a collaboration session may also have an ID, respectively. In a collaboration session, an annotation tag may be associated with a normalized 2-dimensional coordinate related to a unique scene. In some embodiments, coordinates of a location on a scene can be captured on a user device by detecting touches, mouse clicks, or gesture controls from a user of the user device.

In some embodiments, each message of a scene-base-collaboration can carry at least one of a collaboration session ID, a scene or sub-scene ID, and/or a normalized position coordinates related to a scene of the scene-base-collaboration as a discussion context.

Figure 8A:
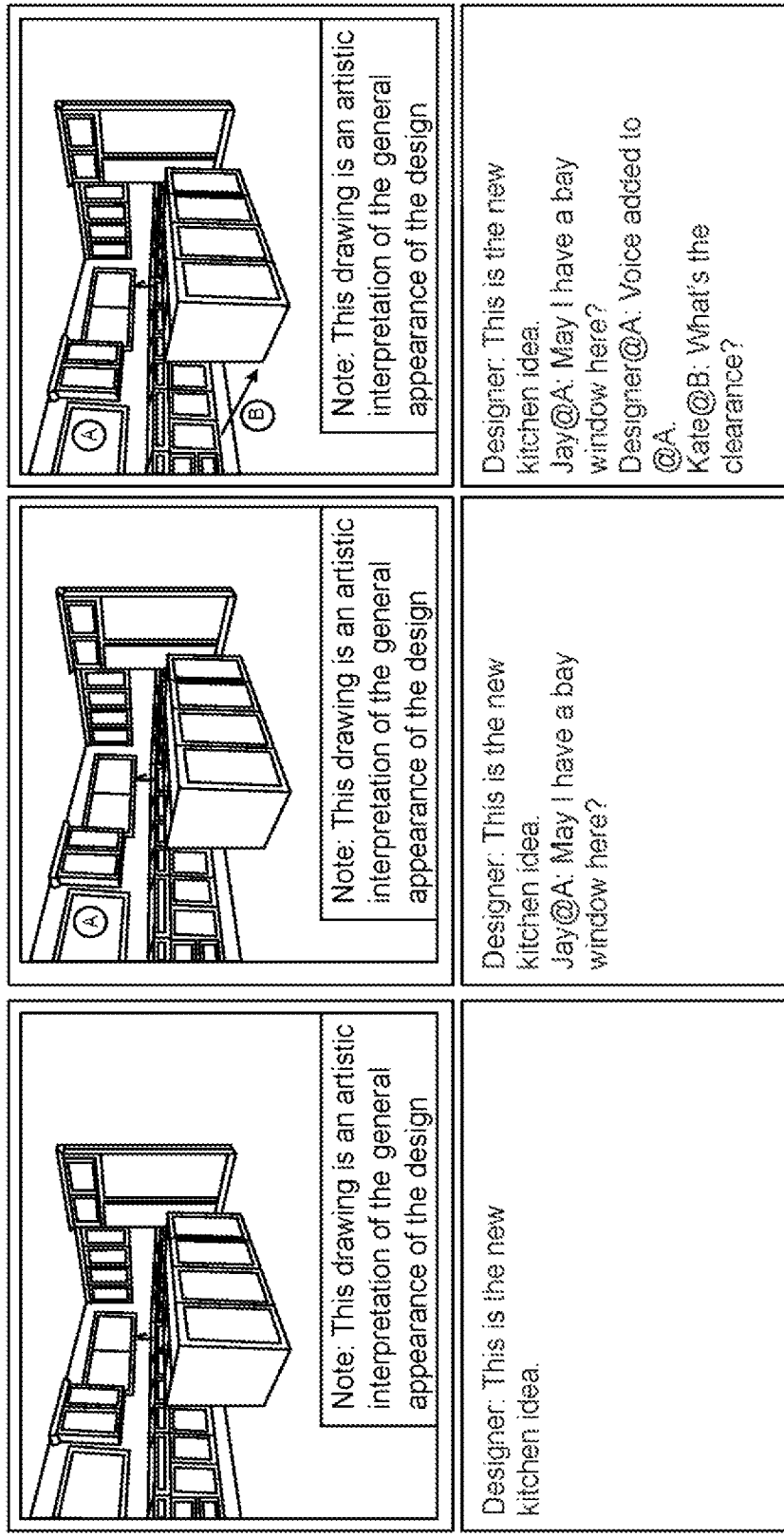
FIG. 8A illustrates an example scene-based collaboration with a timeline in accordance with various embodiments.

FIG. 8A illustrates an example of a timeline based resource-organization-data-structure 800 rendering content of a scene-based collaboration along a timeline in accordance with various embodiments. A user may view content of a scene based collaboration that happened at different sequences in time by selecting corresponding time on the timeline. In some embodiments, a collaboration participant can associate a tag with a coordinate related to a scene and add text/picture/voice/video content that can be indexed by the tag. In some embodiments, content in a scene-based-collaboration can be played back (e.g., like a movie) to help users find out why and how certain decisions were made back in time. A slide bar may be provided with positions corresponding to corresponding timestamps of collaboration threads of the scene-based collaboration.

In some embodiments, a chat compositor is used to bring whiteboard experience to instant message (IM) applications. The chat compositor can be a client-side software component on user devices or reside on a server. A whiteboard that is rendered by the chat compositor can be driven by users' IM communications associated with non-text content (e.g., static image, video animations, or user-created 2D/3D geometrics). For example, a whiteboard can be rendered in response to a new chat message being received. Non-text based chat messages can be transmitted as metadata attached to regular chat message packets.

Figure 8B:
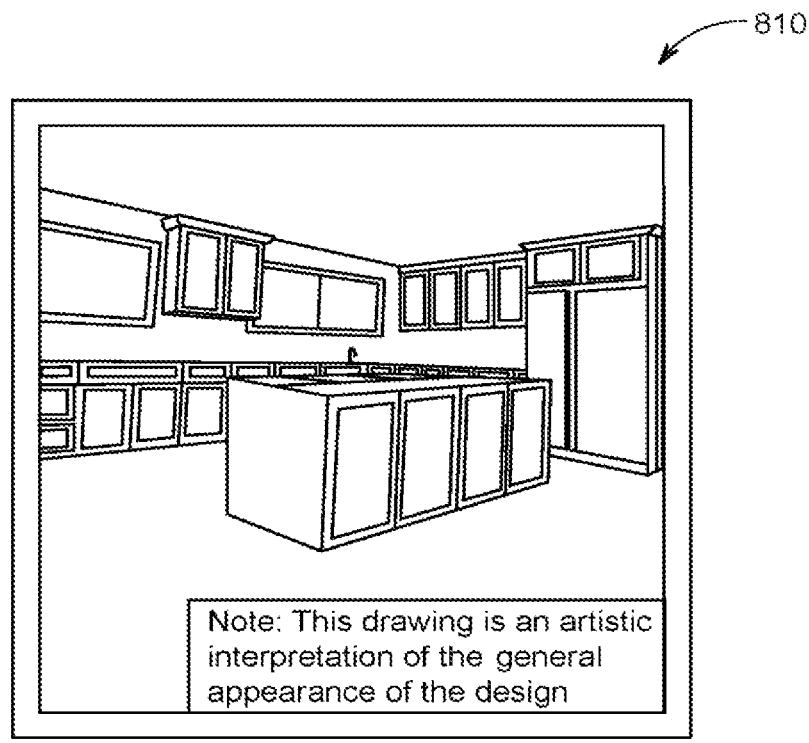
FIGS. 8B-8D illustrates example scene-based collaborations using a chat compositor in accordance with various embodiments.
Figure 8C:
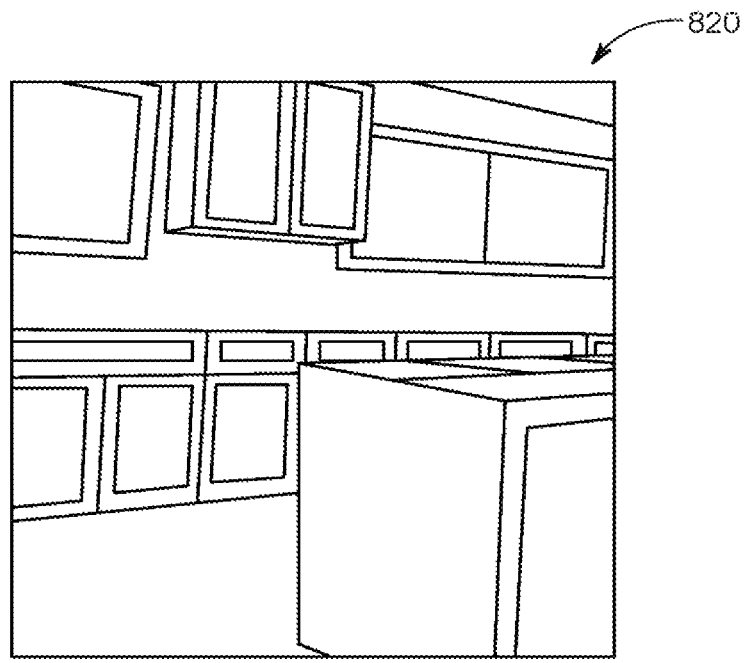
Figure 8D:
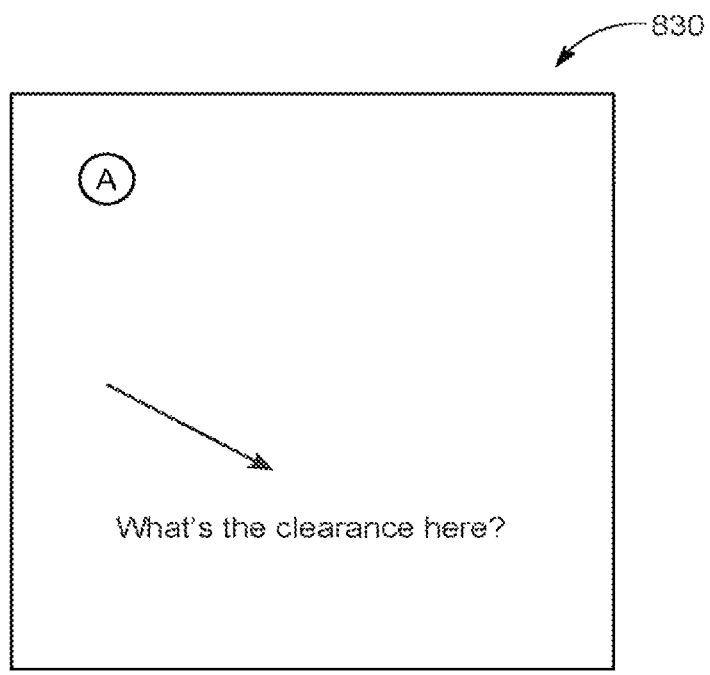

In some embodiments, a chat compositor renders a whiteboard with timeline based chat messages with three content layers that includes a base layer, a sandbox layer and an annotation layer. The base layer 810, as illustrated in FIG. 8B, can be a read-only content layer that is used to render a static image or a clip of video from a participant of a chat session. The sandbox layer 820, as illustrated in FIG. 8C, can include content from the base layer that is modified (e.g., resizing or clipping) by participants of the chat session. The annotation layer 830, as illustrated in FIG. 8D, can include metadata of chat message of the chat session. For example, the annotation layer can include user-generated 2D/3D geometries and texts. In this example, the chat compositor can blend the sandbox layer 820 and the annotation layer 830 to generate the whiteboard 130 for participants of the chat session, as illustrated in FIG. 1E.

Functions or options provided by the chat compositor may include, but are not limited to, resizing or panning a base layer image of a whiteboard that is illustrated in FIG. 8B, rendering annotations including 2D/3D geometries and text on top of the base layer 810 that is illustrated in FIG. 1E, erasing or modifying participants' annotations from the whiteboard, or playing back a particular whiteboard session. In some embodiments, erasing a participant's annotation from the whiteboard may be implemented in a two-step process. First, the annotation is modified or erased from the annotation layer 830, as illustrated in FIG. 8D. Second, content of the whiteboard can be rendered by combining the modified annotation layer 830 with the sandbox layer 820. In some embodiments, a whiteboard is rendered associated with metadata of chat message packets. A timestamp can be linked to each metadata. In response to metadata being downloaded from a chat server and saved on a user device, the chat compositor can render an updated whiteboard by adding the metadata through a linked timestamp.

Figure 9:
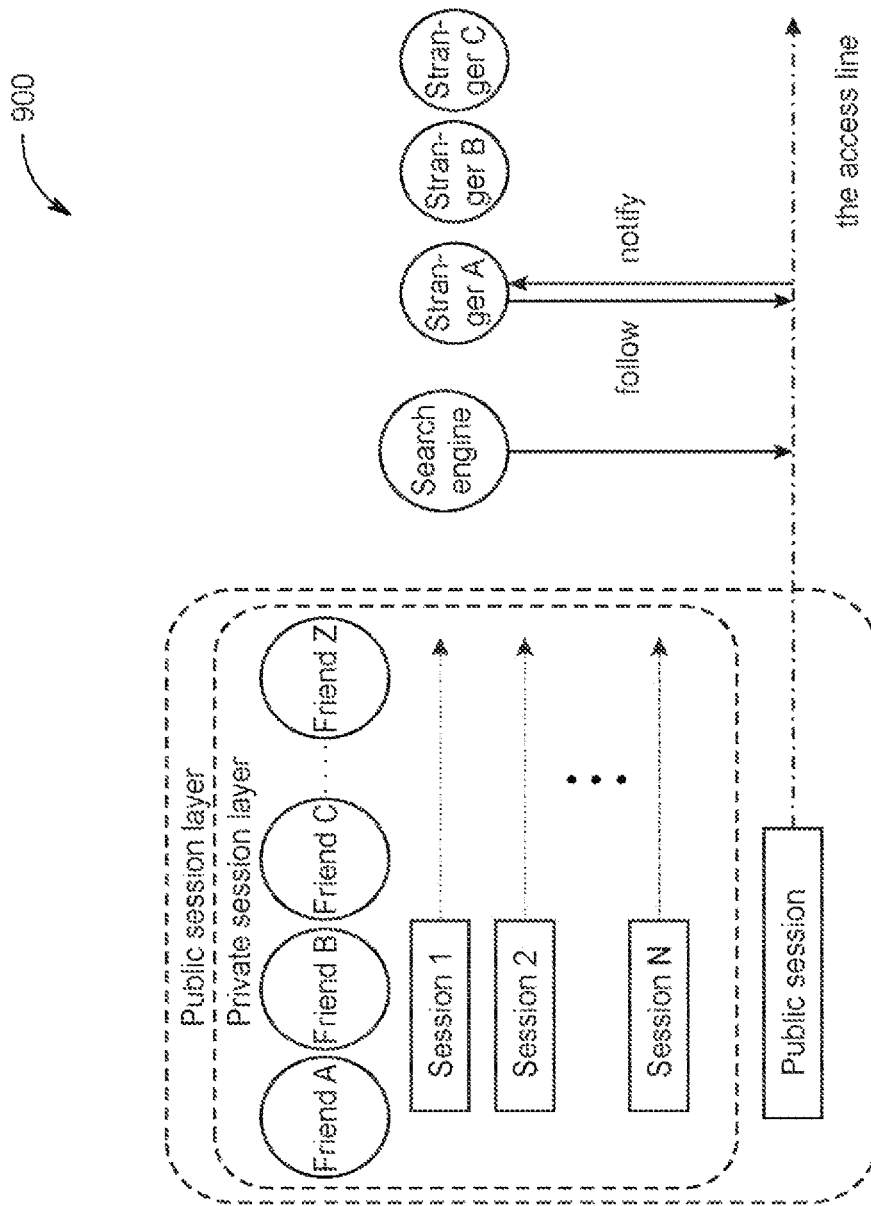
FIG. 9 illustrates an example of two or more session layers in accordance with various embodiments.

FIG. 9 illustrates an example process 900 of managing resources within a session in accordance with various embodiments. In this example, collaboration sessions can be initiated over existing contacts from participants' social circles. In some embodiments, a public session can be a collaboration session which is visible (searchable) to all users including non-friend users and/or anonymous users. A non-friend or an anonymous user may choose to "follow" a certain session so that he/she will be notified whenever a public session is updated by an owner of the public session.

In some embodiments, a personal showcase may be provided. A personal showcase can be a collaboration session between a session host and any possible followers who may or may not in the host's personal contact list. The personal showcase can be publicly accessed. An interested audience can choose to "follow" the showcase (session) and become a "follower". In some embodiments, a personal showcase session can be based upon a chat based collaboration with a scene-support option. Multimedia content (e.g., picture/video) provided by a content provider can be used as a collaboration topic. The personal showcase owner may choose to modify or change the collaboration topic by posting new scenes to the current session or terminating the current scene to start a new session.

For example, a celebrity user may have millions followers in real life. The celebrity user may want to send messages to his or her followers without building his/her own social circle. Some chat providers solved the problem by using a provider-follower model with a 140 characters limit. The present disclosure allows a celebrity user to build a more efficient personal showcase that can be publicly accessed like Twitter. People may choose to become followers of a celebrity by following his/her virtual chat based collaboration. Scene-support option(s) and multimedia content may be added to the virtual chat based collaboration to enhance user experience.

Some embodiments provide drawing tags in a serial of vector based lines. Text, voice, or video can be associated with annotation tags and drawings.

Figure 10:
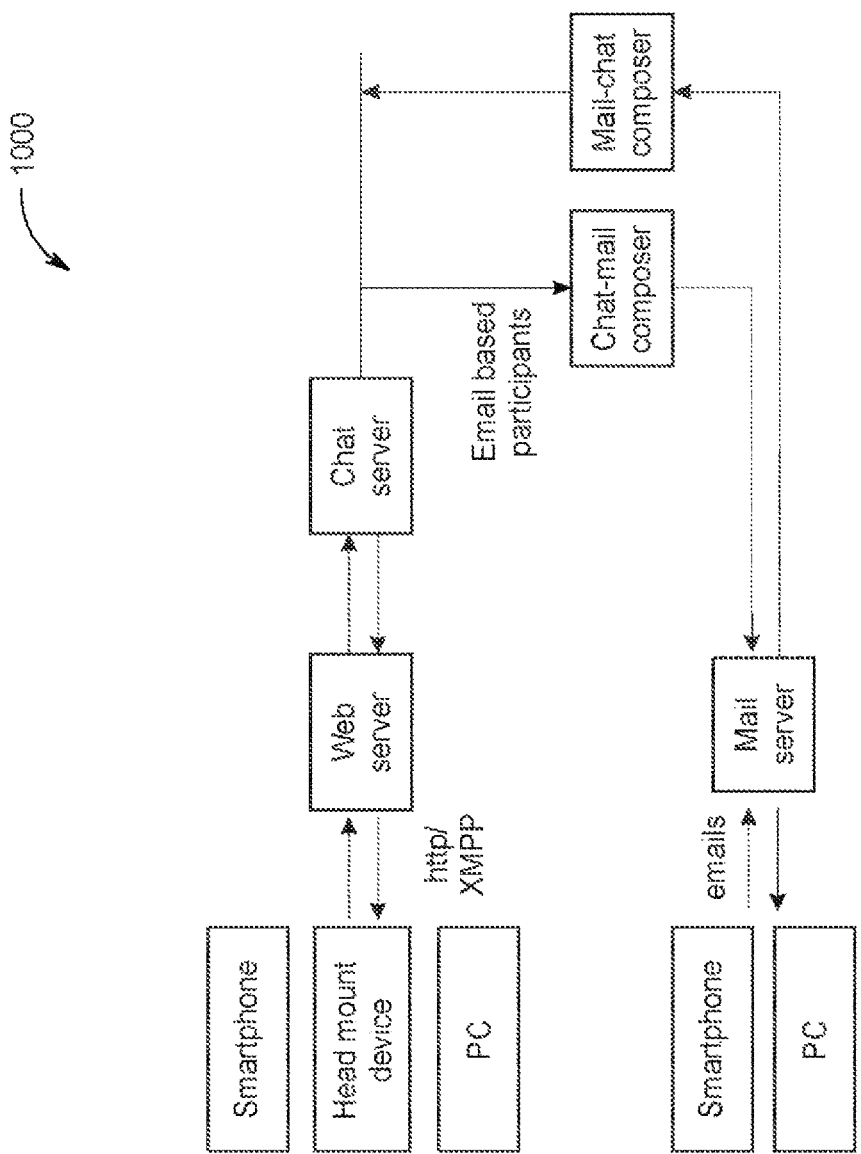
FIG. 10 illustrates an example scene based collaboration with one or more email and chat participants in accordance with various embodiments.

FIG. 10 illustrates an example scene based collaboration 1000 with one or more email and chat participants in accordance with various embodiments. In this example, when a live scene-based collaboration session ends, an offline scene-base-collaboration can be started. The collaboration session can be sent to those email-only based contacts by converting the chat protocol (e.g. XMPP) into email. In some embodiments, a converted email can have a scene and tag information presented in meta-data with pictures/text and attached audio/video clips. The offline scene-base-collaboration can be carried on by email and/or by converting from email back to chat based messages that are inserted back to the chat session that may be visible to all participants or a selected portion of participants. In some embodiments, an http link can be provided for scene based interactions (e.g., tagging text based comments and/or a position based document context) such that the operation can be done over the PC or smartphone browser.

Figure 15:
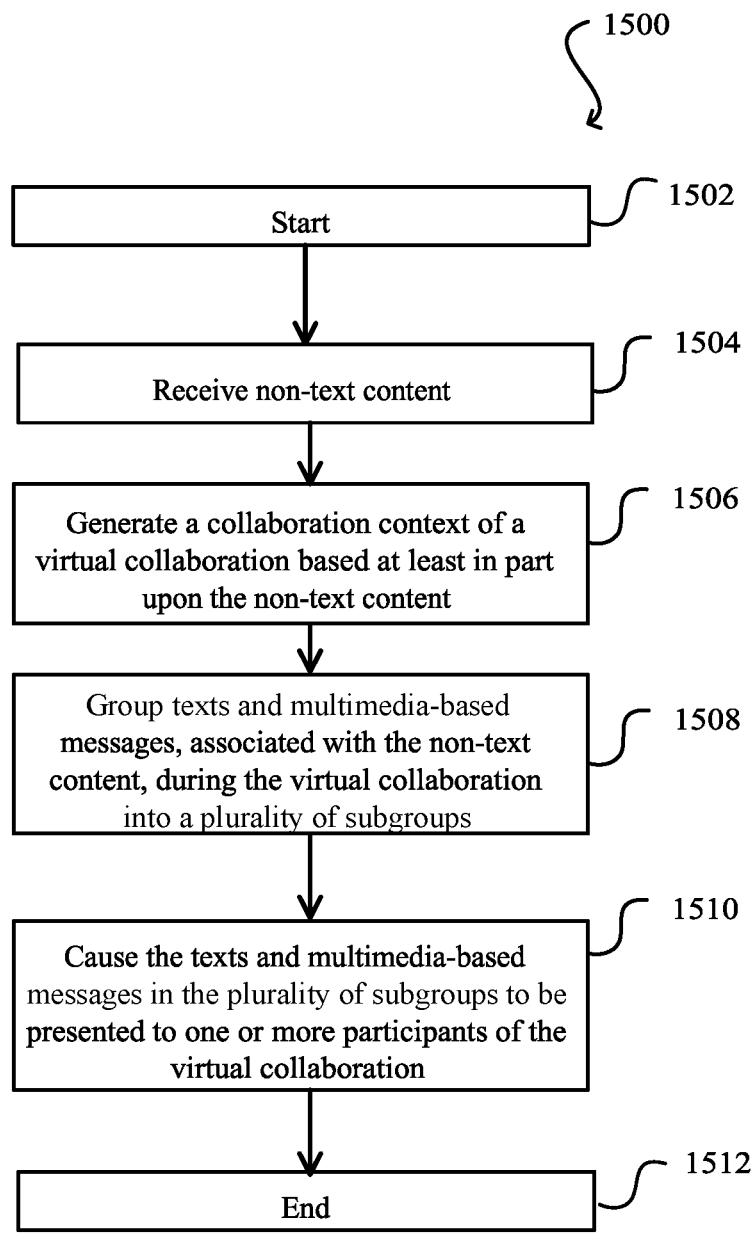
FIG. 15 illustrates an exemplary method of providing a virtual collaboration in accordance with various embodiments.

FIG. 15 illustrates an exemplary method 1500 of providing a virtual collaboration in accordance with various embodiments. It should be understood that the exemplary method 1500 is presented solely for illustrative purposes and that in other methods in accordance with the present technology can include additional, fewer, or alternative steps performed in similar or alternative orders, or in parallel. The exemplary method 1500 starts at step 1502.

At step 1502, non-text content is received on a user device or a participant of the virtual collaboration or a text chatting session desires to share non-text content (e.g., as illustrated in FIGS. 1-10). A collaboration context of the virtual collaboration can be generated based at least in part upon the non-text content, at step 1504. In some embodiments, the collaboration context is generated using a chat compositor. Texts and multimedia-based messages (e.g., as illustrated in FIGS. 1-10) that are associated with the non-text content during the virtual collaboration can be grouped into a plurality of subgroups, at step 1508. Each of the texts and multimedia-based messages can be linked to a timestamp and rendered along a timeline. At step 1510, the texts and multimedia-based messages in the plurality of subgroups are presented to corresponding participants of the virtual collaboration. The exemplary method 1500 ends at step 1512.

Figure 11:
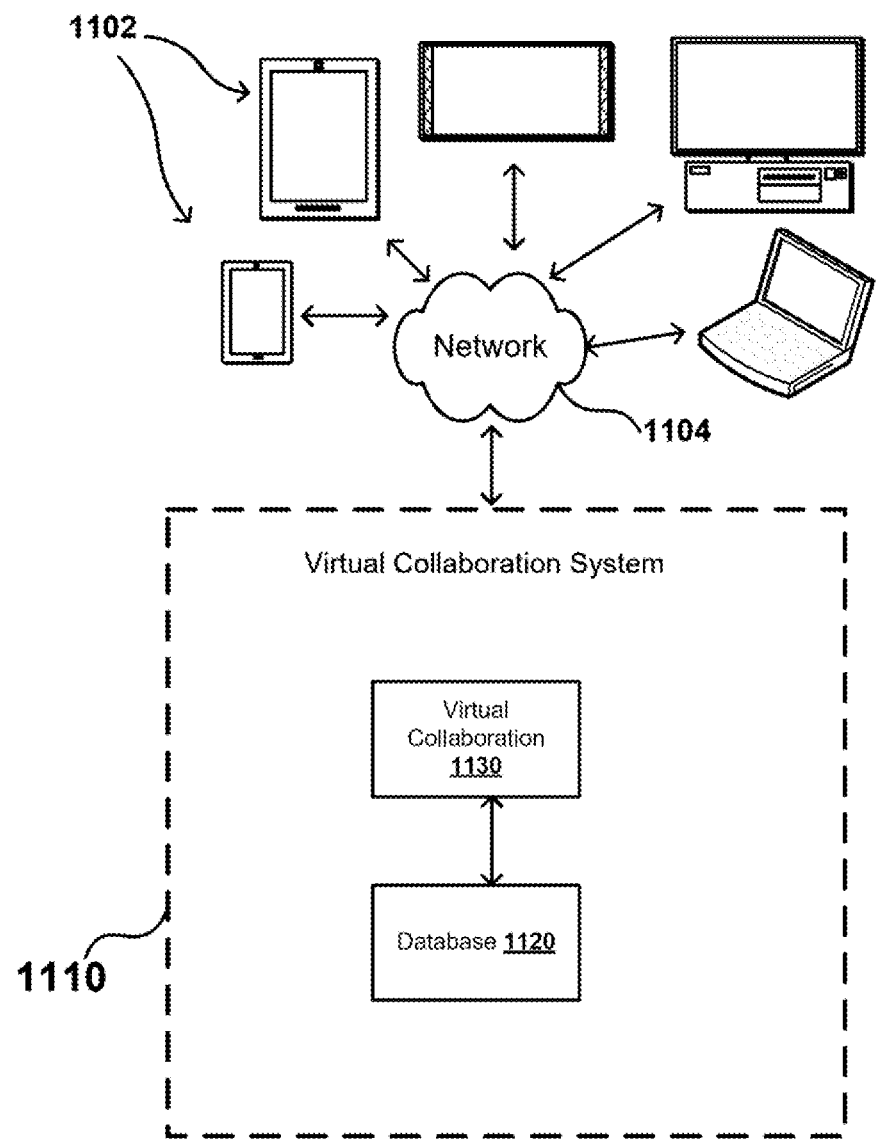
FIG. 11 illustrates an example of a virtual collaboration system 1110 for detecting and recognizing objects and/or features in an image in accordance with various embodiments.

FIG. 11 illustrates an example of a virtual collaboration system 1110 for providing a virtual collaboration in accordance with various embodiments. The virtual collaboration system 1110 communicates with the client computing devices 1102 via the network 1104. Although only a few types of the client device are shown in FIG. 11, it should be understood that various types of electronic or computing device that capable of capturing, receiving and/or processing images in accordance with various embodiments discussed herein. These client devices can include, for example desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs). TVs, DVD players, digital cable boxes, digital video recorders (DVRs), computer systems capable of running a web-browser, or a combination of any two or more of these. The computing device may use operating systems that include, but are not limited to, Android, Berkeley Software Distribution (BSD), iPhone OS (iOS), Linus, OS X, Unix-like Real-time Operating System (e.g., QNX). Microsoft Windows, Window Phone. and IBM z/OS. The computing device 702 may have one or more image capture elements (not shown), such as one or more cameras or camera sensors, to capture images and/or videos. The one or more image capture elements may include a charge-coupled device (CCD), an active pixel sensor in complementary metai-oxide-semiconductor (CMOS) or N-type metal-oxide-semiconductor (NMOS), an infrared or ultrasonic image sensor, or an image sensor utilizing other type of image capturing technologies.

The virtual collaboration system 1110 may include a virtual collaboration module 1130 and a database 1120. The virtual collaboration module 1130 can be operable to render a virtual collaboration and the database 1120 is configured to store content, including text-based and non-text based content, that is associated with the virtual collaboration. In some embodiments, rendering a virtual collaboration can be performed partially or entirely on the client computing devices 1102.

Figures 12A, 12B:
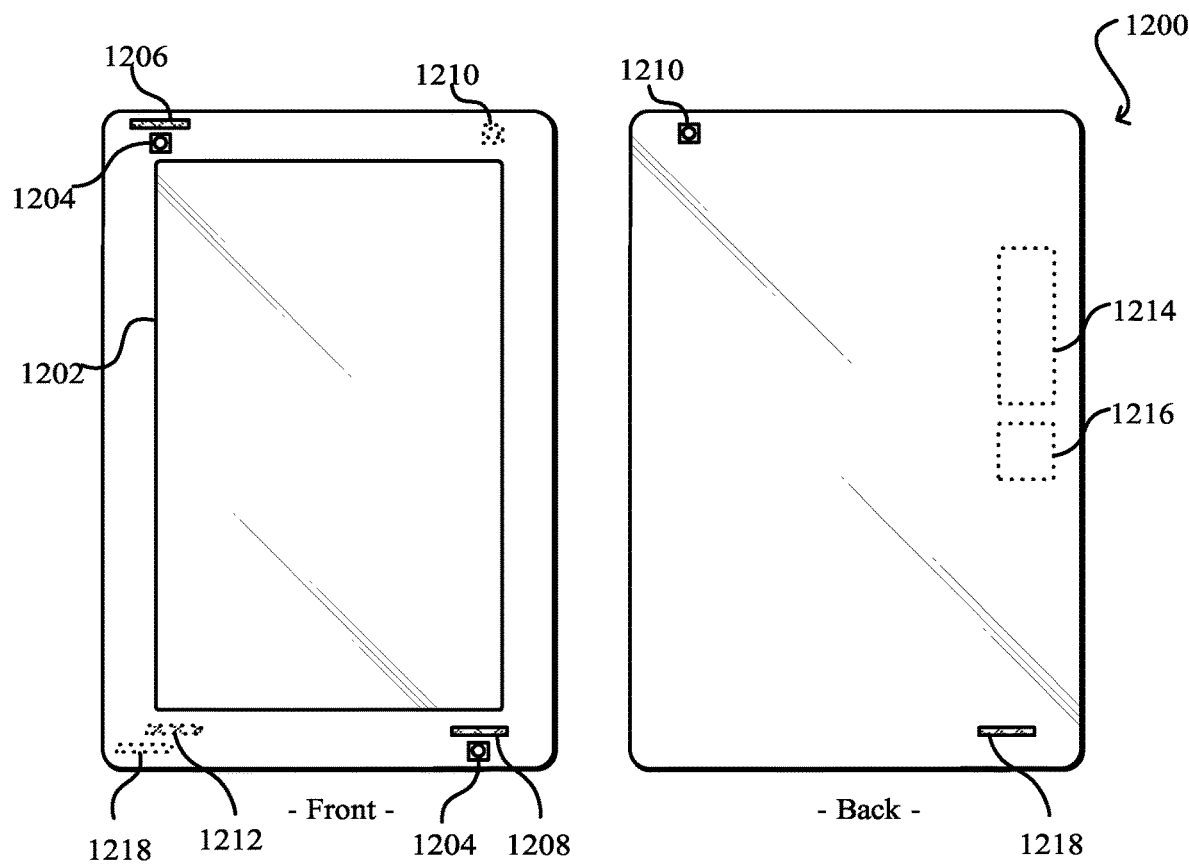
FIGS. 12A and 12B illustrate front and back views, respectively, of an example electronic computing device 1200 that can be used in accordance with various embodiments.

FIGS. 12A and 12B illustrate front and back views, respectively, of an example electronic computing device 1200 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices are capable of receiving, displaying or playing streaming media files in accordance with various embodiments discussed herein. The devices can include, for example, desktop PCs, laptop computers, tablet computers, personal data assistants (PDAs), smart phones, portable media players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, among others.

In this example, the computing device 1200 has a display screen 1202 (e.g., an LCD element) operable to display information or image content to one or more users or viewers of the device. The display screen of some embodiments displays information (e.g., streaming media file) to the viewer facing the display screen (e.g., on the same side of the computing device as the display screen). The computing device in this example can include one or more imaging elements, in this example including two image capture elements 1204 on the front of the device and at least one image capture element 1210 on the back of the device. It should be understood, however, that image capture elements could also, or alternatively, be placed on the sides or corners of the device, and that there can be any appropriate number of capture elements of similar or different types. Each image capture element 1204 and 1210 may be, for example, a camera, a charge-coupled device (CCD), a motion detection sensor or an infrared sensor, or other image capturing technology.

As discussed, the device can use the images (e.g., still or video) captured from the imaging elements 1204 and 1210 to generate a three-dimensional simulation of the surrounding environment (e.g., a virtual reality of the surrounding environment for display on the display element of the device). Further, the device can utilize outputs from at least one of the image capture elements 1204 and 1210 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 1208 on the front side, one microphone 1212 on the back, and one microphone 1206 on or near a top or side of the device. In some devices there may be only one microphone, while in other devices there might be at least one microphone on each side and/or corner of the device, or in other appropriate locations.

The device 1200 in this example also includes one or more orientation- or position-determining elements 1218 operable to provide information such as a position, direction, motion, or orientation of the device. These elements can include, for example, accelerometers, inertial sensors, electronic gyroscopes, and electronic compasses.

The example device also includes at least one computing mechanism 1214, such as may include at least one wired or wireless component operable to communicate with one or more electronic devices. The device also includes a power system 1216, such as may include a battery operable to be recharged through al plug-in approaches, or through other approaches such as capacitive charging through proximity with a power mat or other such device. Various other elements and/or combinations are possible as well within the scope of various embodiments.

Figure 13:
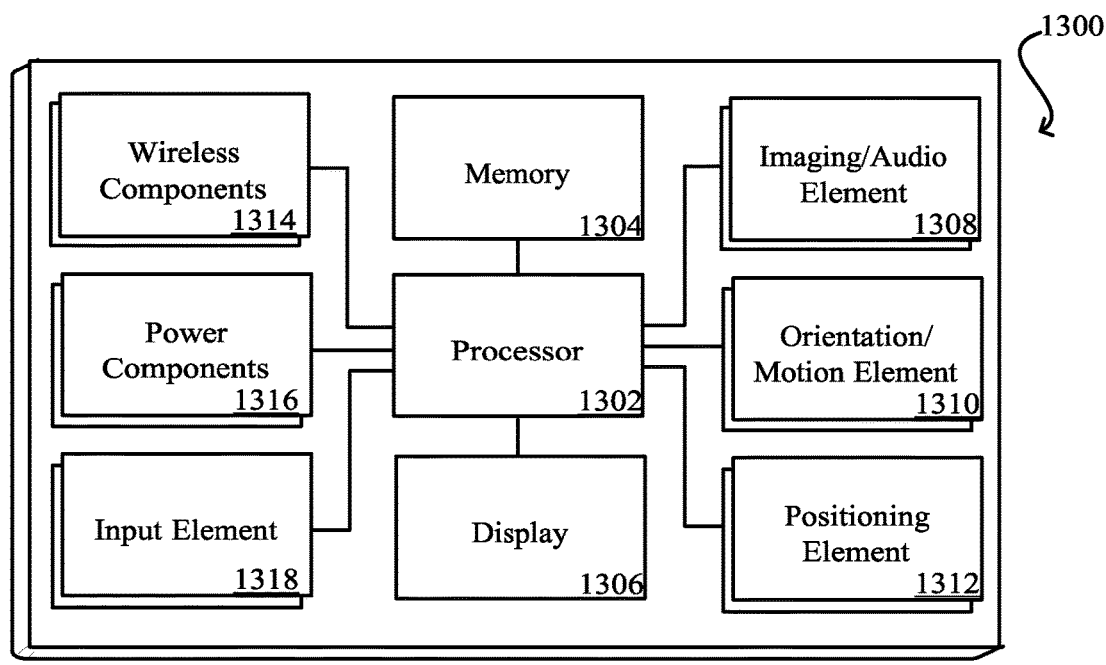
FIG. 13 illustrates a set of basic components of an electronic computing device 1300 such as the device 1200 described with respect to FIG. 12.

FIG. 13 illustrates a set of basic components of an electronic computing device 1300 such as the device 1200 described with respect to FIG. 12. In this example, the device includes at least one processing unit 1302 for executing instructions that can be stored in a memory device or element 1304. As would be apparent to one of ordinary skill in the art, the device can include many types of memory, data storage, or computer-readable media, such as a first data storage for program instructions for execution by the processing unit(s) 1302, the same or separate storage can be used for images or data, a removable memory can be available for sharing information with other devices, and any number of computing approaches can be available for sharing with other devices.

The device typically will include some type of display element 1306, such as a touch screen, electronic ink (e-ink), organic light emitting diode (OLED) or liquid crystal display (LCD), although devices such as portable media players might convey information via other means, such as through audio speakers. The display element 1306 is capable of displaying streaming media files or other information to viewers facing the display element 1306.

As discussed, the device in many embodiments will include at least one imaging/audio element 1308, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1300 also includes at least one orientation/motion determining element 1310 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1300. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1312 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device. In some embodiments, the example computing device 1300 may also include a low power, low resolution imaging element to capture image data. The low resolution imaging element can transmit the captured image data over a low bandwidth bus, such as an 12C bus, to a low power processor, such as a PIC-class processor. The PIC processor may also communicate with other components of the computing device 1300, such as Orientation Motion Element 1310, etc. The PIC processor can analyze the image data from the low resolution imaging element and other components of the computing device 1300 to determine whether the head motion likely corresponds to a recognized head gesture. If the PIC processor determines that the head motion likely corresponds to a recognize head gesture, the PIC processor can enable other image element to activate high resolution image capture and/or main processor to analyze the capture high resolution image data.

The example device also includes one or more wireless components 1314 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more al wired communications connections as known in the art.

The device also includes a power system 1316, such as may include a battery operable to be recharged through al plug-in approaches, or through other approaches such as capacitive charging through proximity with a power mat or other such device. Various other elements and/or combinations are possible as well within the scope of various embodiments.

In some embodiments the device can include at least one additional input device 1318 able to receive al input from a user. This al input can include, for example, a push button, touch pad, touch screen, wheel, joystick, keyboard, mouse, keypad, or any other such device or element whereby a user can input a command or a request for additional product information to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 14:
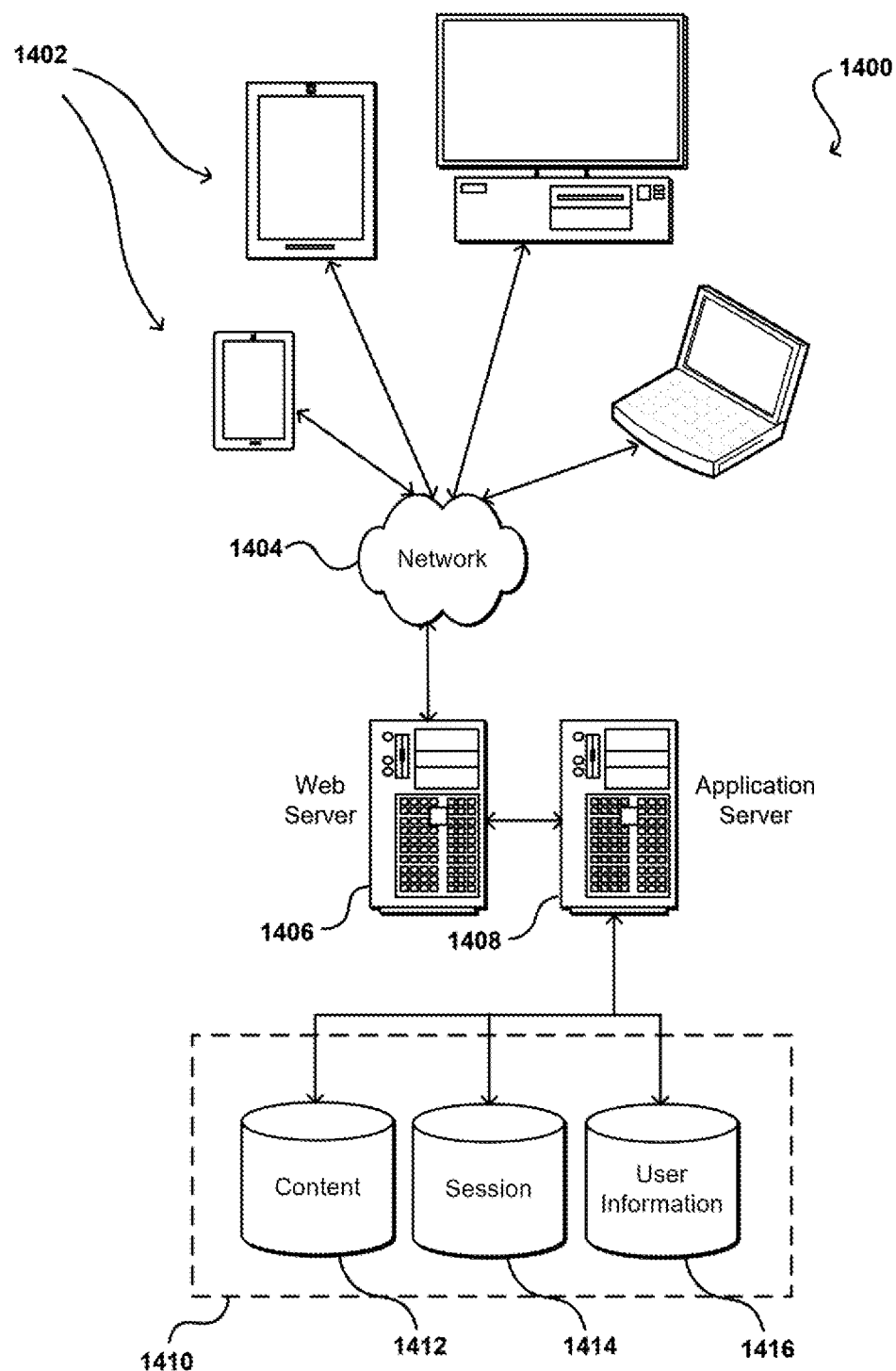
FIG. 14 illustrates an example of an environment 1400 for implementing aspects in accordance with various embodiments

As discussed, different approaches can be implemented in various environments in accordance with the described embodiments. For example, FIG. 14 illustrates an example of an environment 1400 for implementing aspects in accordance with various embodiments. As will be appreciated, although a Web-based environment is used for purposes of explanation, different environments may be used, as appropriate, to implement various embodiments. The system includes an electronic computing device 1402, which can include any appropriate device operable to send and receive requests, messages or information over an appropriate network 1004 and convey information back to a user of the device. Examples of such computing devices include personal computers, cell phones, handheld messaging devices, laptop computers, set-top boxes, personal data assistants, electronic book readers and thelike. The network can include any appropriate network, including an intranet, the Internet, a cellular network, a local area network or any other such network or combination thereof. The network could be a "push" network, a "pull" network, or a combination thereof. In a "push" network, one or more of the servers push out data to the computing device. In a "pull" network, one or more of the servers send data to the computing device upon request for the data by the computing device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 1406 for receiving requests and serving content in response thereto, although for other networks, an alternative device serving a similar purpose could be used, as would be apparent to one of ordinary skill in the art.

The illustrative environment includes at least one application server 1408 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1408 can include any appropriate hardware and software for integrating with the data store 1410 as needed to execute aspects of one or more applications for the computing device and handling a majority of the data access and business logic for an application. The application server provides access control services in cooperation with the data store and is able to generate content such as text, graphics, audio and/or video to be transferred to the user, which may be served to the user by the Web server 1406 in the form of HTML, XML or another appropriate structured language in this example. The handling of all requests and responses, as well as the delivery of content between the computing device 1402 and the application server 1408, can be handled by the Web server 1406. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing content (e.g., production data) 1412 and user information 1416, which can be used to serve content for the production side. The user information 1416 may include user preference, historical data, user demographic data, and audio system of the user devices associated with users. Demographic data of users may include user age, user gender, user educational background, user marital status, user income level, user ethnicity, user postal code, user primary language, or user spending habit. The audio system may include headphone (e.g., earphone, ear bud, and the like), speaker (e.g., tablet speaker, blue tooth speaker, computer speaker, bookshelf speaker, center-channel speaker, floor speaker, in-wall and in-ceiling speaker, outdoor speaker, sound bar, portable speaker, and woofer/sub-woofer speaker), or various types of audio amplifiers. The data store is also shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or computing devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for providing a virtual collaboration, comprising:
   receiving a non-text content;
   generating at least one collaborative session of the virtual collaboration based at least in part upon the non-text content, the at least one collaborative session enabling any of one or more participants of the virtual collaboration to point to a location in the at least one collaborative session, and conduct a plurality of operations including commenting or revising the non-text content, wherein each drawing of the at least one collaborative session is associated with a corresponding timestamp;
   causing multimedia-based messages to be presented on at least one computing device of the one or more participants of the virtual collaboration, wherein the virtual collaboration presented on a display of the at least one computing device comprises a sandbox layer spanning the entirety of the virtual collaboration, wherein the sandbox layer includes content of the non-text content and enables at least two participants of the at least one collaborative sessions to erase or modify each other's non-text content; and
   providing an option for one participant of the one or more participants to render an annotation tag associated with a 2-dimensional coordinate of the location in the at least one collaborative session.

2. The computer-implemented method of claim 1, further comprising playing back the at least one collaborative session of the virtual collaboration based at least upon timestamps associated with drawings of the at least one collaborative session.

3. The computer-implemented method of claim 2, wherein the playing back the at least one collaborative session of the virtual collaboration comprises providing a slide bar for a user of the computing device to view a corresponding drawing associated with a specific timestamp.

4. The computer-implemented method of claim 1, wherein the annotation tag of the at least one collaborative session has an annotation ID.

5. The computer-implemented method of claim 4, wherein the at least one collaborative session further enables text messages associated with the at least one collaborative session, wherein each text message of the at least one collaborative session has a text ID.

6. The computer-implemented method of claim 5, wherein each annotation tag of the at least one collaborative session is associated with a normalized 2-dimensional coordinate in relation to the non-text content.

7. The computer-implemented method of claim 1, wherein the virtual collaboration presented on the display of the computing device further comprises an annotation layer, wherein the annotation layer includes metadata of geometries and text messages of the at least one collaborative session, and wherein the annotation layer enables the at least two participants of the at least one collaborative sessions to erase or modify each other's metadata of geometries and text messages of the at least one collaborative session.

8. The computer-implemented method of claim 1, further comprising: determining that the at least one collaborative session has ended, and enabling an offline scene-based collaboration.

9. A system, comprising:
a processor; and
a computer-readable medium storing instructions that, when executed by the processor, cause the system to perform operations comprising:
receiving a non-text content;
generating at least one collaborative session of the virtual collaboration based at least in part upon the non-text content, the at least one collaborative session enabling any of one or more participants of the virtual collaboration to point to a location in the at least one collaborative session, and conduct a plurality of operations including commenting or revising the non-text content, wherein each drawing of the at least one collaborative session is associated with a corresponding timestamp;
causing multimedia-based messages to be presented on at least one computing device of the one or more participants of the virtual collaboration, wherein the virtual collaboration presented on a display of the at least one computing device comprises a sandbox layer spanning the entirety of the virtual collaboration, wherein the sandbox layer includes content of the non-text content and enables at least two participants of the at least one collaborative sessions to erase or modify each other's non-text content; and
providing an option for one participant of the one or more participants to render an annotation tag associated with a 2-dimensional coordinate of the location in the at least one collaborative session.

10. The system of claim 9, wherein the annotation tag of the at least one collaborative session has an annotation ID.

11. The system of claim 10, wherein each annotation tag of the at least one collaborative session is associated with a normalized 2-dimensional coordinate in relation to the non-text content.

12. The system of claim 9, wherein the virtual collaboration presented on the display of the computing device further comprises an annotation layer, wherein the annotation layer includes metadata of geometries and text messages of the at least one collaborative session, and wherein the annotation layer enables the at least two participants of the at least one collaborative sessions to erase or modify each other's metadata of geometries and text messages of the at least one collaborative session.

13. The system of claim 9, wherein the operations further comprise determining that the at least one collaborative session has ended, and enabling an offline scene-based collaboration.

14. A non-transitory computer-readable storage medium including instructions that, when executed by at least one processor of a computing system, cause the computing system to perform operations comprising:
receiving a non-text content;
generating at least one collaborative session of the virtual collaboration based at least in part upon the non-text content, the at least one collaborative session enabling any of one or more participants of the virtual collaboration to point to a location in the at least one collaborative session, and conduct a plurality of operations including commenting or revising the non-text content, wherein each drawing of the at least one collaborative session is associated with a corresponding timestamp;
causing multimedia-based messages to be presented on at least one computing device of the one or more participants of the virtual collaboration, wherein the virtual collaboration presented on a display of the at least one computing device comprises a sandbox layer spanning the entirety of the virtual collaboration, wherein the sandbox layer includes content of the non-text content and enables at least two participants of the at least one collaborative sessions to erase or modify each other's non-text content; and
providing an option for one participant of the one or more participants to render an annotation tag associated with a 2-dimensional coordinate of the location in the at least one collaborative session.

15. The computer-implemented method of claim 1, wherein the at least one collaborative session of the virtual collaboration is a container of a plurality types of user interaction content, the plurality types of user interaction content including text, voice, a picture and a video.

16. The computer-implemented method of claim 1, wherein the annotation tag includes text, voice, a picture, a drawing, and a video.

17. The computer-implemented method of claim 1, wherein the annotation tag further includes a system-assigned index, and user interaction content of the one or more participants of the virtual collaboration, the user interaction content including text, voice, a picture, and a video.

18. The system of claim 9, wherein the at least one collaborative session of the virtual collaboration is a container of a plurality types of user interaction content, the plurality types of user interaction content including text, voice, a picture and a video.

* * * * *